ically predetermined per-
United States Patent
Sullivan

[15] 3,665,326
[45] May 23, 1972

[54] AUTOMATIC THRESHOLD DETECTOR WITH SELECTABLE PERCENTAGE OF THRESHOLD CROSSINGS

[72] Inventor: Dean R. Sullivan, Lakeside, Calif.
[73] Assignee: The United States of America as represented by the Secretary of the Navy
[22] Filed: Mar. 30, 1970
[21] Appl. No.: 24,015

[52] U.S. Cl. ..........................328/151, 235/92 PB, 307/235, 328/146
[51] Int. Cl. ........................................................H03b 3/02
[58] Field of Search..................328/150, 151, 115, 116, 162, 328/163, 146; 307/235, 264; 235/92 PB

[56] References Cited

UNITED STATES PATENTS

| | | | |
|---|---|---|---|
| 3,375,450 | 3/1968 | Ayres et al. | 328/150 |
| 3,493,964 | 2/1970 | Hunger | 235/92 PB X |
| 3,534,273 | 11/1970 | Thomas | 328/15 X |
| 3,543,169 | 11/1970 | Hill | 328/151 |
| 3,456,201 | 7/1969 | Zrubek | 328/151 X |

Primary Examiner—Richard A. Farley
Assistant Examiner—R. Kinberg
Attorney—R. S. Sciascia, George J. Rubens and J. W. McLaren

[57] ABSTRACT

An automatic threshold detector provides a variable-threshold correction voltage that allows a selectively predetermined percentage of an incoming signal to exceed a threshold voltage when the signal is sampled at a given rate. The detector generates a logic "one" for each crossing and a "zero" for each non-crossing of the threshold. The "one" and "zero" counts are then converted by digital techniques into a feedback correction voltage to maintain the selectively predetermined percentage of "ones" at the output.

5 Claims, 7 Drawing Figures

Patented May 23, 1972

INVENTOR.
DEAN R. SULLIVAN
BY
George J. Rubens
ATTORNEYS

INVENTOR.
DEAN R. SULLIVAN
BY
ATTORNEYS

AUTOMATIC THRESHOLD DETECTOR WITH SELECTABLE PERCENTAGE OF THRESHOLD CROSSINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present inventive concept is directed towards threshold devices of the automatic type which can operate independently without the intervention of personnel to maintain performance within acceptable limits. These devices generally comprise closed-loop devices in which correction is made continuously in real-time and closed-loop devices in which portions of the processing are not performed in real-time, but instead are performed by the parallel operation of equipment that feeds corrections back into the loop.

FIG. 1 is an illustration of a typical prior art threshold device of the type mentioned above in which corrections are made continuously in real-time. An analog-to-digital (A/D) converter compares the incoming signal (analog input) against the threshold voltage and provides a "one" logic level for signal amplitudes greater than the threshold and a "zero" logic level for signal amplitudes less than the threshold. The results are then time quantized into output timing. A portion of the output is fed back through an amplifier and a low-pass filter to the analog-to-digital converter. The threshold level moves in a direction tending to maintain the output near the desired percentage of "ones."

Devices of the above-described type possess several limitations and disadvantages which are overcome by the present invention to be hereinafter described.

These devices do not provide for an accurate and easily selectable percentage of threshold crossings by actual numerical count at the output. Instead these devices perform this function by analog techniques which require that the output be uniquely trimmed for each component because the output can drift from the center value due to changes in temperature and due to component aging.

Furthermore, these devices do not possess the capability of stop-hold-start operation which is essential for threshold multiplexing and for threshold "locking" during frequency changes. Since these devices do not hold the threshold by digital circuitry, threshold voltages cannot be accurately held in memory and started again from that point at a later time.

SUMMARY OF THE INVENTION

An automatic threshold detector that maintains input signal threshold crossings at a selectively predetermined percentage of the signal is disclosed. The detector provides a variable threshold correction to thereby allow the predetermined percentage of the signal to exceed the threshold voltage when sampled at a given rate. The output is furnished in binary form. A "one" output represents a threshold crossing, and a "zero" output represents a failure to cross or exceed the threshold. The percentage crossings are maintained constant by an actual numerical count of the crossings. This function operates continuously and is directly translated into feed-back corrections. By simple switch selection a large range of percentages can be selected. The threshold digital equivalent is held by a counter translated directly to the analog threshold voltage which can be stopped and held for indefinite periods of time. The detector automatically maintains the selected percentage despite changes in input signal level, temperature, or normal variations in component parameters. By utilizing digital control techniques, the detector can be phase-synchronized from external apparatus and operated at various rates, and the speed of response can be varied.

OBJECTS OF THE INVENTION

It is the primary object of the present invention to provide an automatic threshold detector that allows a selectively predetermined percentage of an incoming signal to exceed a threshold voltage.

It is another object of the present invention to provide an automatic threshold correction device that maintains input signal crossings at a selectively predetermined percentage.

It is a further object of the present invention to provide an automatic threshold detector that maintains percentage crossings constant by an actual numerical count of the crossings.

It is a further object of the present invention to provide an automatic threshold detector that possesses the capability of stop-hold-start operation.

It is a final object of the present invention to provide an automatic threshold correction device that furnishes the output in digital form.

Other objects, advantages and novel features of the invention will become apparent from the following detailed description of the invention when considered in conjunction with the accompanying drawings.

DESCRIPTION OF THE PREFERRED EMBODIMENTS

Figure 1:
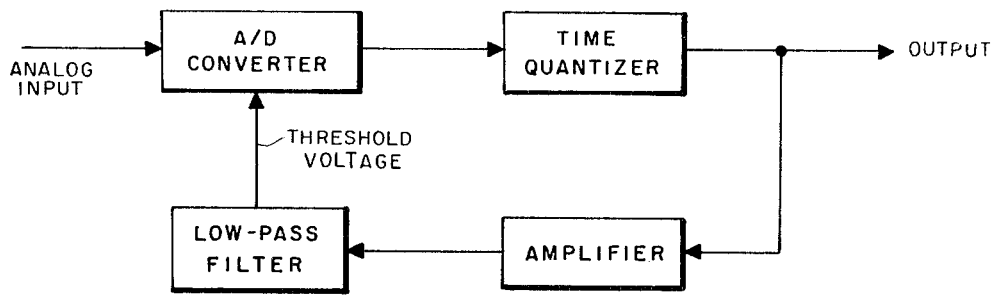
FIG. 1 is an illustration of a typical prior art automatic threshold detector.
Figure 3A:
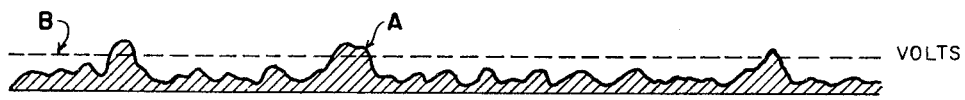
Figure 2:
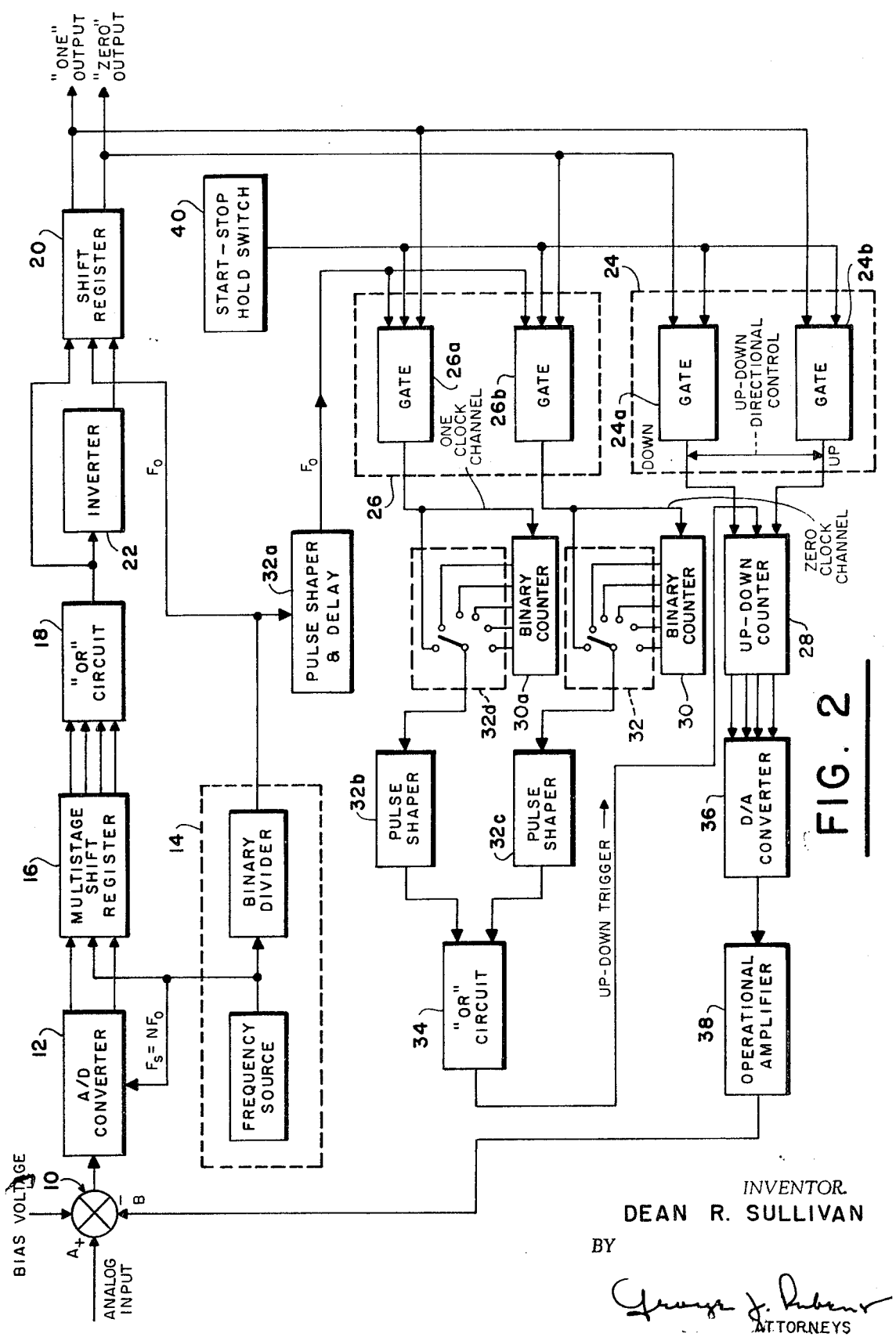
FIG. 2 is a schematic block diagram of an automatic threshold detector embodying the present inventive concept; and, FIG. 3 is a graphical representation of typical waveforms of the type utilized in the threshold correction device of FIG. 2.

In FIG. 2, an analog input signal A and a feedback or threshold voltage B comprises two inputs to a summing junction 10. The input signal A, which consists of both signal and noise as shown in FIG. 3(a), and the threshold voltage B, which is shown with polarity inversion in FIG. 3(a), are compared in the summing junction. A bias voltage may be required at junction 10 to prevent voltage crossover when operating near zero.

If the sum of the two voltages is positive, the output of the analog-to-digital (A/D) converter 12 will be a logic "one," indicating that the input signal amplitude is above the threshold level. If the sum of the two voltages is negative, the output of the A/D converter 12 will be a logic "zero," indicating that the input signal amplitude is below the threshold level.

Figure 3B:
Figure 3C:
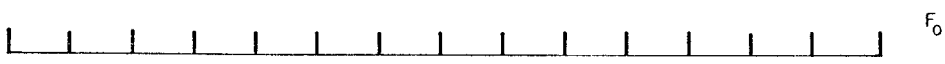

The A/D converter makes the above described logic decisions at a selectively predetermined sampling rate $F_s$ as shown in FIG. 3(b). The sampling rate $F_s$ is normally related to the output rate $F_o$ by some whole number $(n)$, thereby allowing the two rates to be obtained from the same oscillator or frequency source (clock) 14 and consequently remain in phase lock.

The minimum value of the sampling rate $F_s$ is dictated by the incoming signal bandwidth and sampling theory well-known to those skilled in the art. The output rate $F_o$ is normally dictated by the external equipment and will usually be less than the sampling rate.

Figure 3D:
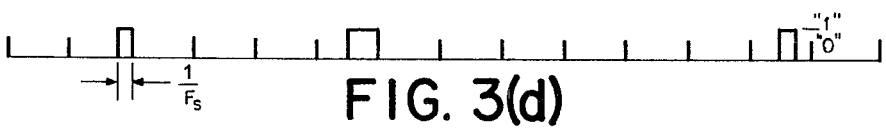
Figure 3E:
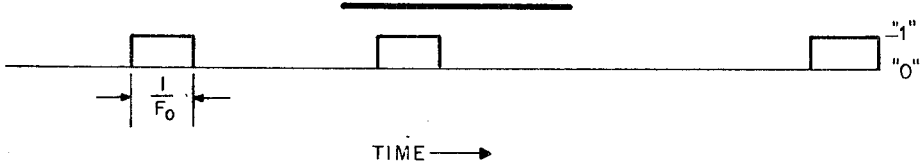

It should be noted that the sampled output of the threshold detector will consist of a series of logic "ones" and "zeros" corresponding to whether or not the input signal exceeded the threshold for a particular time as shown in FIG. 3(d). The final output will thus consist of a series of time bins, each bin containing either a "one" or a "zero." The time bins will in turn be directly related to a particular time interval of the input signal waveform A. Since normally $F_s = nF_o$, there will be $n$ samples of the input signal taken for each time bin.

The output of the A/D converter 12 is fed to a multistage shift register 16. Since the sampling rate $F_s$ is equal to $n$ times the output rate $F_o$, the shift register 16 must hold the last $n$ samples. Based on the number of "ones" stored in these samples, a particular bin is declared to be either a "one" or a "zero."

With various arrangements of logic, different restrictions on the decision can be made. For example, more than a "one" may be required to be present among the N samples to declare a "one" bin. However, in the present description of the preferred embodiment, a single sample at a logic "one" is the acceptance criterion for declaring the output to be a "one."

Consequently, only an "OR" circuit is required to combine the samples held in the shift register 16. The output of the "OR" circuit 18 is fed to a single-stage shift register 20 to allow for reclocking of the output data into the proper bin length and phase.

Thus, the output of the shift register 20 reads the output into external equipment such as, for example, digital processors, at the proper phase and output rate acceptable to the external equipment. The inverter 22 is required only if the particular shift register circuit used utilizes both normal and complementary inputs.

In addition to reading the output decisions into external equipment, the shift register 20 also feeds the output decisions by means of a feedback-path to the up-down direction control gates 24 to provide directional control pulses to the up-down counter 28, and to the clock-control gates 26 for the purpose of processing stepping triggers for the up-down counter 28 in a manner to be described hereinafter.

A "one" output will allow an $F_o$ pulse to be "anded" through the gate 26a, and a "zero" condition will allow an $F_o$ pulse to be "anded" through the gate 26b. A binary divider (counter) 30 and divisor-selection switch 32 are provided in either the "one" or "zero" channels in accordance with the percentage of "ones" to "ones plus zeroes" desired out.

The percentage P of "ones" to "ones plus zeroes" is given by the following equation:

$$P = (N/N + M) \times 100$$

where $N$ is the number of "ones" or crossings and M is the number of "zeros" or non-crossings.

If for example, it is desired to allow only 3.03 percent of the input signal to exceed the threshold, for every crossing ($N = 1$), 32 non-crossings ($M = 32$) are required. In other words with a countdown of one thirty-second (five binary stages) in the "zero" channel, the percentage of "ones" at the output will be $$3.03\% = (1/32 + 1) \times 100.$$

If 50 percent "ones" are desired, no count division is required in either channel. For greater than 50 percent "ones," the binary divider 30 and the divisor switch 32 are placed in the "one" channel, and for less than 50 percent "ones," the binary divider 30 and the divisor switch 32 are placed in the "zero" channel which is the condition shown in FIG. 2.

It should be appreciated that a binary counter 30a and a divisor switch 32d in the "one" channel provides greater flexibility in the selection of the desired percentage. In such a case, N is equal to the countdown of the "one" channel and M is equal to the countdown of the "zero" channel.

It should be noted that since the binary divider 30 is a binary counter, any integer countdown value desired can be obtained by means of appropriate control circuitry.

The outputs of the "one" and "zero" channels, are coupled to the "OR" circuit 34 which combines the outputs into a single-ended trigger pulse for stepping the up-down counter 28.

The up-down counter 28 will step up or down, based upon the directional control pulse provided by the gates 24 and the availability of a trigger pulse from the combined "one" and "zero" channels. Obviously, for a 50 percent output, a trigger will be available each bin time. However, with outputs less than 50 percent, a trigger will not always be available to step the counter 28 due to the countdown value.

Each output of the up-down counter 28 is fed to an input of a digital-to-analog (D/A) converter 36 in accordance with the binary weight of each stage of the counter. The D/A converter provides an analog voltage directly proportional to the count held in the counter 28. This transformation is very accurate and repeatable as is typical of good D/A converters.

The operational amplifier 38 provides an impedance transformation between the D/A converter 36 and the summing junction 10.

The number of stages in the up-down counter 28 establishes the magnitude of the steps in the threshold voltage for any given voltage range. The step size and up-down counter rate essentially establish the rate of response of the loop. In general, the gated clock inputs and the up-down counter allow threshold corrections to be provided if the output tends to deviate from the desired percentage of "one" bins at the output.

Consequently the percentage of "one" bins at the output must center around the established percentage. The extent of variance around this value is dependent on several items (e.g., loop response, analog input bandwidth, etc.). It should be noted that the maximum slewing rate for threshold correction will depend on whether the threshold is high or low.

For example, with a 3.03 percent threshold selection, and assuming the threshold is allowing 100 percent "ones" out (threshold too low), the threshold will correct at the $F_o$ rate, but with a 100 percent "zeros" out (threshold too high), the threshold will be corrected at the $F_o/32$ rate.

The reason for this is as follows. With the threshold too low (100 percent "ones" out), the $F_o$ clock rate will be going through gate 26a 100 percent of the time, and, consequently, since there is no countdown in this channel, there will be a trigger signal at the up-down counter every bin time. On the other hand, with the threshold too high (100 percent "zeros" out) the $F_o$ clock rate will be going through gate 26b, 100 percent of the time.

Thus there will be a trigger available at the up-down counter only at the $F_o/32$ rate because of the countdown in the "zero" channel.

Even though slewing rates are different, the total time required to reach the selected threshold level is the same from either 100 percent or 0 percent "ones." The above discussion would be significant only if a step or equivalent change were applied to the input since normally the threshold would be oscillating slightly above and below the desired percentage.

To provide stop-hold-start operation, inhibiting gate intervals are applied to the gates 24 and 26 by means of switch 40 during times when it is desirable to lock the analog threshold at the last level adjusted. The threshold loop can be made active only during certain gated intervals and will be locked down at an analog value at the termination of the incoming gate. This value will remain constant until the gate comes on again, at which time the threshold will rapidly adjust to maintain a near-constant percentage of crossings at the output. This mode can be used during times when the threshold is not required and/or the input is likely to be erratic. The output can, but probably would not be, used during times when the loop is locked down, since no guarantee can be made of the correct percentage during this time.

The clock rate for the up-down counter directly affects the rate of response of the loop and is the same as $F_o$. If a faster stepping rate is desired, the input of the pulse shaper 32a can be moved further up the preceding binary chain. The three pulse shapers 32a, 32b, and 32c are utilized to reshape the timing transitions, thereby insuring clean gating. Depending upon circuit layout, additional units may be required for reshaping and delaying.

Some of the parameter changes such as up-down counter rate, step size, sample criterion, timing, etc., have been discussed, but not illustrated, in FIG. 2 since they merely require switching in or out of standard logic circuitry. The discussion of these items points out the additional flexibility that is available within the same threshold format. In most cases they would be fixed by design choices unless it is required that they be changeable in the final equipment.

FIG. 3 shows exemplary key waveforms at various points in the circuit of FIG. 2. The input analog waveform A is shown in FIG. 3(a) with the threshold voltage B against which it is compared. The actual threshold used is negative, rather than positive as illustrated, to allow the difference of the two waveforms to be obtained when summed. The difference that exists between the analog waveform and the threshold is checked at the sampling rate ($F_s$) shown in FIG. 3(b). The output bin timing rate ($F_o$) is shown in FIG. 3(c). FIG. 3(d) shows the data stored in the multistage shift register 16. The final output shown in FIG. 3(e) is the result obtained from the sample decisions.

Note that at one particular time the input signal exceeded the threshold level for a length of time equivalent to two sampling intervals; this is indicated in FIG. 3(d) by a pulse twice the width of the other pulses. In the illustration, the bin decisions are shown to occur after the sample decisions which initiated them because the bin decisions can occur only after the sample decisions for that bin are present.

The width of the sampling pulse can be seen to be the reciprocal of the sampling frequency. Further, the width of the output bin is the reciprocal of the bin frequency.

Thus it can be seen that a novel automatic threshold correction apparatus that allows a selectively predetermined percentage of an incoming analog signal to exceed a threshold voltage has been disclosed. Obviously many modifications and variations of the present invention are possible in the light of the above teachings. It is therefore to be understood that within the scope of the appended claims the invention may be practiced otherwise than as specifically described.

For example, a rate switch control can be provided at the output of the clock 14 to allow the clock source for the up-down counter 28 to be increased or decreased thereby varying the loop response. Such a switch could be ganged to select rates compatible with the divisor selection switch 32 so that loop response could be maintained constant as the percentage of crossings is changed.

Furthermore, a polarity inverting operational amplifier can be switched in series with the amplifier 38 and the normal ('-'one") and complementary ("zero") outputs of the A/D converter 12 can be reversed (by switching) to allow operation from a negative going input source.

What is claimed is:

1. Automatic threshold correction apparatus for maintaining the percentage of crossings of a threshold voltage by an analog input signal constant comprising:

means for sampling said input signal and for providing a digital decision for every crossing and a complementary digital decision for every non-crossing;

means for producing a trigger pulse in response to every $N$ crossings and in response to every $M$ non-crossings wherein said percentage of crossings is equal to the ratio $N/(N+M) \times 100$;

means for producing directional control pulses in response to said digital decisions and said complementary digital decisions; and, up-down counter means for producing a feedback correction to said threshold voltage in response to said trigger pulses and said directional control pulses.

2. The apparatus of claim 1 wherein said means for sampling said input signal comprises analog-to-digital converter means and wherein said digital decisions comprises "one" logic levels and said complementary digital decisions comprise "zero" logic levels.

3. The apparatus of claim 1 wherein said means for producing said trigger pulses includes binary counter means in a first channel for counting said digital decisions and binary counter means in a second channel for counting said complementary digital decisions.

4. The apparatus of claim 3 wherein said binary counter means further include divisor selection switch means.

5. The apparatus of claim 1 further including digital-to-analog converter means coupled to the output of said up-down counter means.

* * * * *